US012799004B2

(12) United States Patent
Drewry, III

(10) Patent No.: US 12,799,004 B2
(45) Date of Patent: Nov. 17, 2026

(54) PROCESS FOR REMOVAL OF NITRATE AND PERCHLORATE FROM FLUID

(71) Applicant: CALGON CARBON CORPORATION, Moon Township, PA (US)

(72) Inventor: Charles B. Drewry, III, New Braunfels, TX (US)

(73) Assignee: CALGON CARBON CORPORATION, Moon Township (PA)

( * ) Notice: Subject to any disclaimer, the term of this patent is extended or adjusted under 35 U.S.C. 154(b) by 598 days.

(21) Appl. No.: 18/179,882

(22) Filed: Mar. 7, 2023

(65) Prior Publication Data

US 2023/0278895 A1 Sep. 7, 2023

Related U.S. Application Data

(60) Provisional application No. 63/317,372, filed on Mar. 7, 2022.

(51) Int. Cl.

| | |
|---|---|
| ***C02F 1/42*** | (2023.01) |
| ***B01J 41/05*** | (2017.01) |
| ***B01J 41/12*** | (2017.01) |
| ***B01J 49/57*** | (2017.01) |
| *C02F 101/12* | (2006.01) |
| *C02F 101/16* | (2006.01) |
| *C02F 103/00* | (2006.01) |
| *C02F 103/06* | (2006.01) |
| *C02F 103/20* | (2006.01) |

(52) U.S. Cl.

CPC ................. *C02F 1/42* (2013.01); *B01J 41/05* (2017.01); *B01J 41/12* (2013.01); *B01J 49/57* (2017.01); *C02F 2001/422* (2013.01); *C02F 2101/12* (2013.01); *C02F 2101/163* (2013.01); *C02F 2103/008* (2013.01); *C02F 2103/06* (2013.01); *C02F 2103/20* (2013.01); *C02F 2303/16* (2013.01)

(58) Field of Classification Search

CPC ...... C02F 1/42; C02F 9/00; C02F 5/10; C02F 2001/422; C02F 2101/12; C02F 2101/163; C02F 2103/008; C02F 2103/06; C02F 2103/20; C02F 2303/16; C02F 2103/001; C11D 7/18; B01J 41/05; B01J 49/57; B01J 49/53; B01J 49/00; B01J 49/07; B01J 41/12; B01J 39/07; B01J 39/14; B01J 47/02

See application file for complete search history.

(56) References Cited

U.S. PATENT DOCUMENTS 4,479,877 A * 10/1984 Guter ........................ B01J 41/05 210/683
5,415,770 A * 5/1995 Heskett ..................... C02F 9/20 210/257.2
6,569,329 B1 * 5/2003 Nohren, Jr. ............ B01D 61/18 210/489
9,169,136 B1 * 10/2015 Morgan .................... A23L 2/78
2004/0256597 A1 12/2004 Barrett et al.
2005/0115905 A1 * 6/2005 Yan .......................... B01J 41/04 210/903
2005/0239632 A1 * 10/2005 Clarke ...................... B01J 49/57 210/683
2005/0274927 A1 * 12/2005 Guter ...................... C02F 3/348 252/180
2007/0114178 A1 * 5/2007 Coppola .................. B01J 41/07 210/660
2007/0272615 A1 11/2007 Batista
2008/0116123 A1 * 5/2008 Jensen ...................... C02F 1/42 210/98
2010/0213134 A1 * 8/2010 Campbell ................. C02F 1/42 210/285
2015/0266015 A1 * 9/2015 Choi ........................ B01J 41/12 252/181
2018/0050932 A1 * 2/2018 Oliver ...................... B01J 49/57
2018/0105441 A1 * 4/2018 Subban ............... C02F 1/46109
2018/0118598 A1 * 5/2018 Green ................ B01D 15/1864
2023/0088379 A1 * 3/2023 Mortimore ............... B01J 41/13 252/184
2023/0131868 A1 * 4/2023 Zontov ..................... C02F 3/34 210/631

OTHER PUBLICATIONS

Remediating Perchlorate contaminated groundwater using ion exchange, 2003. (Year: 2003).*
Urbans Aqua anion resin online catalog (wayback tool shows online availability as of Nov. 4, 2017). (Year: 2017).*
(Continued)

*Primary Examiner* — Jennifer Dieterle
(74) *Attorney, Agent, or Firm* — DLA Piper LLP (US)

(57) ABSTRACT

A method as described herein may include contacting a fluid with a single resin to cause the single resin to bond to nitrates and perchlorates contained in the fluid. The method may regenerate the single resin by a regeneration process comprising contacting the single resin with a salt solution, wherein regenerating removes a substantial portion of the nitrates contained within the single resin but does not remove a substantial portion of the perchlorates contained within the single resin, wherein the single resin comprises a nitrate-specific resin and does not comprise a perchlorate-specific resin.

10 Claims, 1 Drawing Sheet

(56) References Cited

OTHER PUBLICATIONS

Calgon Carbon perchlorate and nitrate removal CalRes 2103 resin fact sheet. CalRes2103 was available back in 2016 when cited in the Bergquist et al., article noted below. (Year: 2013).*
Water Quality Association Fact Sheets for perchlorates (2013). (Year: 2013).*
Burge et al., Nitrate and Perchlorate Removal from Groundwater by Ion Exchange, 1999. (Year: 1999).*
Bergquist et al., Evaluation of a hybrid ion exchange-catalyst treatment technology for nitrate removal from drinking water, 2016. (Year: 2016).*
Lehman et al., Perchlorate and nitrate treatment by ion exchange integrated with biological brine treatment, 2008. (Year: 2008).*
Faccini et al., Regeneration of a perchlorate-exhausted highly selective ion exchange resin: Kinetics study of adsorption and desorption processes, Separation and Purification Technology, 158 (2016) 266-274. (Year: 2016).*
Water Quality Association Fact Sheets for nitrates (2013). (Year: 2013).*
Wastewater Digest, Calgon Carbon's ISEP is First System Approved for Perchlorate, Nitrate Treatment, 2000. (Year: 2000).*
Chapter 8—Ion Exchange, Water Demineralization & Resin Testing of the Handbook of Industrial Water Treatment (found at lon Exchange & Water Demineralization Handbook | Veolia). Downloaded 2026 (Year: 2026).*

* cited by examiner

| DATE (January) | RAW WATER | | | TREATED WATER | | INFLUENT | | | EFFLUENT | | | |
|---|---|---|---|---|---|---|---|---|---|---|---|---|
| | WELL 13 100CF | WELL 18 100CF | WELL 19 100CF | DAILY TOTAL 100 CF | DAILY TOTAL MG | WELL 13 NO3 IC ppm | WELL 18 NO3 IC ppm | WELL 19 NO3 IC ppm | NO3 IC ppm | BACTI | 123TCP ppb | PERCHLORATE ppb |
| 1 | 0 | 0 | 0 | 0 | 0.000 | | | | | | | |
| 2 | 1154 | 0 | 0 | 1154 | 0.863 | | | | | | | |
| 3 | 1258 | 0 | 0 | 1258 | 0.941 | | | | | | | |
| 4 | 666 | 32 | 0 | 698 | 0.522 | 18 | 17 | | 2.4 | ND | | ND |
| 5 | 623 | 0 | 0 | 623 | 0.456 | | | | | | | |
| 6 | 1515 | 0 | 57 | 1572 | 1.176 | | | | | | | |
| 7 | 1222 | 0 | 0 | 1222 | 0.914 | | | | | | | |
| 8 | 807 | 0 | 0 | 807 | 0.604 | | | | | | | |
| 9 | 1051 | 0 | 0 | 1051 | 0.786 | | | | | | | |
| 10 | 1268 | 0 | 0 | 1268 | 0.948 | | | | | | | |
| 11 | 1208 | 0 | 0 | 1208 | 0.904 | | | | 2.4 | | | |
| 12 | 2114 | 0 | 0 | 2114 | 1.581 | | | | | | | |
| 13 | 2401 | 0 | 375 | 2401 | 1.796 | | | | | | | |
| 14 | 1057 | 0 | 0 | 1432 | 1.071 | | | | | | | |
| 15 | 1000 | 0 | 0 | 1000 | 0.748 | | | | | | | |
| 16 | 1470 | 0 | 0 | 1470 | 1.100 | | | | | | | |
| 17 | 2268 | 0 | 0 | 2268 | 1.696 | | | | | | | |
| 18 | 2731 | 0 | 0 | 2781 | 2.080 | | | | | | | |
| 19 | 1565 | 0 | 0 | 1565 | 1.171 | | | 19 | 32 | | | |
| 20 | 2451 | 0 | 0 | 2451 | 1.833 | | | | | | | |
| 21 | 481 | 0 | 0 | 481 | 0.360 | | | | | | | |
| 22 | 0 | 0 | 0 | 0 | 0.000 | | | | | | | |
| 23 | 1533 | 0 | 497 | 2030 | 1.518 | | | | | | | |
| 24 | 2000 | 0 | 235 | 2235 | 1.672 | | | | | | | |
| 25 | 1756 | 0 | 306 | 2062 | 1.542 | | | | 3.3 | | | |
| 26 | 1068 | 1032 | 1095 | 3195 | 2.390 | | | | | | | |
| 27 | 0 | 2395 | 1351 | 3746 | 2.802 | | | | | | | |
| 28 | 0 | 2101 | 509 | 2610 | 1.952 | | | | | | | |
| 29 | 0 | 2069 | 278 | 2347 | 1.756 | | | | | | | |
| 30 | 0 | 1488 | 849 | 2338 | 1.749 | | | | | | | |
| 31 | 0 | 1198 | 442 | 1640 | 1.227 | | | | | | | |

PROCESS FOR REMOVAL OF NITRATE AND PERCHLORATE FROM FLUID

CROSS-REFERENCE TO RELATED APPLICATIONS

This application claims priority to U.S. Provisional Application No. 63/317,372, filed on Mar. 7, 2022, which is hereby incorporated by reference in its entirety.

FIELD

The present disclosure relates generally to methods and products for treating water. More specifically, the present disclosure relates to the removal of nitrates and perchlorates from a water source in a streamlined and regenerative process.

BACKGROUND

Water treatment is a crucial aspect of modern society, and materials and processes for improving the efficiency and efficacy of water treatment are ever improving. There are many potential contaminants that must be removed by water treatment systems, and different systems, methods, and compositions are often employed to remove or otherwise reduce the harm caused by different contaminants. Conventional materials for water treatment and removal or harm reduction of contaminants include activated carbon, ion exchange resins, chemical treatments, and catalysts.

Examples of known contaminants include nitrates and perchlorates from a water source. Each contaminate is understood in the art to be different from the other and thus prior to this disclosure, it was common for skilled persons to select two separate systems to remove first perchlorates and then nitrates. Removing both nitrates and perchlorates in one system with one or more a nitrate-specific resins has been attempted but industry consensus is that contacting nitrate-specific resins with perchlorate-containing fluid streams will substantially decrease the life of the nitrate-specific resins.

The current state of the art thus requires at least two separate sorbent beds, with each sorbent bed containing at least one nitrate- or perchlorate-specific resin, processes to remove first perchlorates and then nitrates with a perchlorate-specific resin followed by a nitrate-specific resin. This requires significant time and physical space to remove these contaminants.

SUMMARY

In some aspects, the techniques described herein relate to a method for removing nitrates and perchlorates from a fluid that contains nitrates and perchlorates, the method including: contacting the fluid with a single resin to cause the single resin to bond to the nitrates and perchlorates, and regenerating the single resin by a regeneration process including contacting the single resin with a salt solution, wherein regenerating removes a substantial portion of the nitrates contained within the single resin but does not remove a substantial portion of the perchlorates contained within the single resin, wherein the single resin includes a nitrate-specific resin and does not include a perchlorate-specific resin.

In some aspects, the techniques described herein relate to a method, wherein the fluid is water.

In some aspects, the techniques described herein relate to a method, wherein the water is selected from the group including groundwater, wastewater, industrial wastewater, drinking water, agricultural runoff water, ballast water, aquaculture water, and a combination thereof.

In some aspects, the techniques described herein relate to a method, wherein the fluid contains up to about 50 ppm nitrates prior to removal.

In some aspects, the techniques described herein relate to a method, wherein the fluid contains up to about 10 ppm nitrates after removal.

In some aspects, the techniques described herein relate to a method, wherein the fluid contains up to about 35 ppb perchlorates prior to removal.

In some aspects, the techniques described herein relate to a method, wherein the fluid contains at most about 5 ppb perchlorates after removal.

In some aspects, the techniques described herein relate to a method, wherein the single resin is a strong base anion resin.

In some aspects, the techniques described herein relate to a method, wherein the regeneration process uses about 6 pounds to about 9 pounds of salt per cubic foot of single resin.

In some aspects, the techniques described herein relate to a method, further including a subsequent contacting step and a subsequent regenerating step.

In some aspects, the techniques described herein relate to a method, wherein the subsequent contacting step and the subsequent regenerating are repeated until the single resin can no longer remove perchlorates from the fluid.

In some aspects, the techniques described herein relate to a method, wherein the subsequent contacting step and the subsequent regenerating are repeated until the single resin can no longer remove nitrates from the fluid.

In some aspects, the techniques described herein relate to a method, wherein regenerating does not cause the bonded perchlorate on the single resin to bond to a different portion of the single resin.

In some aspects, the techniques described herein relate to an intermediate resin product including a body of a single resin and an amount of perchlorate that cannot be removed by regenerating the single resin with salt regeneration, wherein the single resin includes a nitrate-specific resin and does not include a perchlorate-specific resin.

In some aspects, the techniques described herein relate to an intermediate resin product, wherein a first portion of the body of the single resin product is completely saturated with perchlorate and cannot retain additional perchlorate or nitrate, and a second portion of the of the body of the single resin product has substantially no bonded perchlorate and could retain additional perchlorate or nitrate if so contacted.

BRIEF DESCRIPTION OF THE DRAWINGS

Aspects, features, benefits and advantages of the embodiments described herein will be apparent with regard to the following description, appended claims, and accompanying drawings where:

The FIG. 1s a table of results from a water treatment facility using the method of the present disclosure, demonstrating the efficacy of the removal of nitrates and perchlorates.

DETAILED DESCRIPTION

This disclosure describes examples of removing nitrates and perchlorates from water. Examples of regenerating the resin used for removal are also described.

The present disclosure describes a method for using a nitrate-specific resin to remove both nitrates and perchlorates from a fluid source, which in some embodiments includes water in water treatment facilities. It is traditionally understood in the field that removing nitrates and perchlorates requires two separate steps, first removing perchlorates by contacting a perchlorate-specific resin with a fluid to thereby yield a perchlorate depleted effluent, and subsequently removing nitrates by contacting the perchlorate depleted effluent with a nitrate-specific resin to yield a perchlorate and nitrate depleted effluent. It has been previously attempted to remove both nitrates and perchlorates from a fluid source by contacting the fluid with only a single resin in a single bed, but it was found that this conventional technique reduced the lifetime of the resin. Furthermore, using a single resin typically results in widespread contamination of the resin with perchlorates, which cannot be removed by salt regeneration. Thus, it is now the standard in the art to utilize two separate resins to remove nitrates and perchlorates.

It was therefore surprising and unexpected that the inventors discovered that it was possible to successfully remove both perchlorates and nitrates from fluid with a single resin with minimal or no detriment to the operative lifetime of the single resin. Disclosed herein are methods of removing both nitrates and perchlorates by contacting at least one fluid with a single resin. In some embodiments, the single resin is a nitrate removal resin, which the inventors surprisingly discovered is capable of removing perchlorates and maintaining nitrate and perchlorate removal performance over longer lifetimes than realized by the prior art. Conventional single resins are typically replaced after less than one year of use if contacted with fluids which contain perchlorates. However, the method of the present disclosure allows a single resin to achieve an operative lifetime of greater than five years, with minimal or substantially no reduction in nitrate and perchlorate removal performance.

In all embodiments, both nitrates and perchlorates are removed from a fluid stream in whole or in part by contacting the fluid stream with a single resin. The single resin can be a nitrate removal resin, also referred to as a nitrate-specific resin. In this context, "single resin" means, although there could be additional resins for other purposes, there is no separate or dedicated resin for removing perchlorates. In some embodiments, the single resin of the present disclosure includes a nitrate-specific resin (which may be a strong base anion resin) and does not include a perchlorate-specific resin, such as a resin that is specifically designed for the removal of perchlorates. In some embodiments, the single resin of the present disclosure includes a nitrate-specific resin and further includes one or more additional resins that are designed for the removal of compounds such as chromium, perfluoroalkyl and polyfluoroalkyl substances (PFAS), arsenic, antimony, and the like, and does not include a perchlorate-specific resin.

The fluid stream is not limited, but it is typically a fluid that has not been treated or has undergone minimal treatment for undesired compounds. For example, the fluid stream can include one or more of groundwater, wastewater, industrial wastewater, drinking water, agricultural runoff water, ballast water, aquaculture water, or a combination of one or more of the preceding fluid streams. An incoming fluid stream that is to be treated typically contains an amount of nitrates up to about 50 ppm, for example up to about 10 ppm, up to about 20 ppm, up to about 30 ppm, up to about 40 ppm, or any range that includes one or more of the preceding values as endpoints, such as about 10 ppm to about 50 ppm, or about 10 ppm to about 40 ppm, or about 10 ppm to about 30 ppm, or about 10 ppm to about 20 ppm. After contacting the fluid with the single resin, the resulting effluent may contain at most about 10 ppm nitrates (as N), for example at most 8 ppm, at most 6 ppm, at most 4 ppm, at most 2 ppm.

The fluid stream may also contain other compounds such as perchlorates. The amount of perchlorates is not limited and is in the amount of up to about 35 ppb, for example up to about 10 ppb, up to about 20 ppb, up to about 30 ppb, or any range that that is formed from one of the preceding values, such as about 10 ppb to about 35 ppb, about 20 ppb to about 35 ppb, or about 30 ppb to about 35 ppb. After contacting the fluid with the single resin, the amount of the perchlorates is reduced in the effluent that is formed, and in some cases the resulting effluent may contain at most 10 ppb perchlorates, for example at most about 8 ppb, at most about 6 ppb, at most about 5 ppb, at most about 4 ppb, or at most about 2 ppb, or a range formed from two or more of the preceding values.

After contacting the fluid with the single resin, nitrates and perchlorates will be bound onto the single resin to thus produce an effluent with a reduced amount of nitrates. Although the single resin is frequently selected to adsorb the nitrates, the single resin also adsorbs the perchlorates. In some embodiments, the amount of nitrates adsorbed is greater than the amount of perchlorates adsorbed, for example when the nitrates are present in the incoming fluid stream are about 50 ppm, while perchlorates are present in the same incoming fluid stream are about 35 ppb. Thus, there will, in certain embodiments, be a greater amount measured in weight percent of nitrates adsorbed onto the single resin than perchlorates. The fluid that has been contacted with the single resin may be collected for use or further treatment.

In some configurations, the single resin is a nitrate-specific resin, such as a strong base anion (SBA) resin. The polymer that is used to form the single resin is not limited and can be one or more of, for example, polystyrene, poly(divinyl benzene), a copolymer of styrene and divinyl benzene (DVB), or an acrylic copolymer. In some embodiments, the single resin is a polymer functionalized with a quaternary ammonium group, such as quaternized trialkyl amines. Exemplary trialkyl amines that may be present as quaternary groups on the polymers of the present disclosure include but are not limited to trimethylamine, triethylamine, tripropylamine, tributylamine, dimethylethanolamine, diisopropylethylamine, and the like. By selecting a nitrate-specific SBA resin as the single resin, the inventors surprisingly discovered that the single resin would continue to have excellent performance removing both nitrates and perchlorates from liquid. While not wishing to be bound by theory, it is believed that the nitrate-specific SBA resin prevents the diffusion of bonded perchlorate within the resin while that resin is being regenerated by way of salt regeneration. Because of this phenomenon, a column of nitrate-specific strong base anion (SBA) resin will retain a substantial amount of bonded perchlorate adjacent to or near the inlet for the fluid that contains the nitrates and perchlorates, but this perchlorate will not diffuse or otherwise contaminate the portion of the resin that is located near the fluid outlet. Thus, the effluent that exits a bed of the nitrate-specific SBA retains a low level of perchlorate contamination.

The single resin may be regenerated to restore some of its adsorption capacity. Regeneration occurs, in some embodiments, via a regeneration process which may be a salt regeneration, where a salt solution containing at least one of sodium chloride or potassium chloride contacts the single resin. The regeneration process can include washing, flushing, or otherwise contacting the single resin with the salt solution. The concentration of the salt solution is not limited and can be about 6 pounds of salt per cubic foot of resin to about to about 9 pounds of salt per cubic foot of resin to be regenerated, such as about 6 pounds, about 6.5 pounds, about 7 pounds, about 7.5 pounds, about 8 pounds, about 8.5 pounds, about 9 pounds, or any range or value contained therein.

During regeneration, nitrates associated on the single resin are removed and the capacity of the single resin to associate nitrates is restored or is substantially restored. Regeneration may remove all or a portion of the nitrates contained within the single resin. In some embodiments, regeneration removes a substantial portion of nitrates contained within the single resin, wherein a substantial portion is considered to be some or most, but not all, of the nitrates contained within the single resin. Perchlorates associated on the single resin are, in some embodiments, not removed by such action and remain bound onto the single resin. Considering the relatively low amount of perchlorates compared to a higher amount of nitrates, it is understood that any capacity loss of the single resin due to the bound perchlorates in each sequence of treatment and regeneration steps will be low to the point of not substantially affecting the overall capacity of the single resin. In some embodiments, regenerating does not cause the perchlorate which is bonded to the single resin to bond to a different portion of the single resin.

In some embodiments, regeneration produces an intermediate single resin product which includes a body of a single resin as described herein and an amount of perchlorate that cannot be removed by regenerating the single resin with salt regeneration, such as the regeneration methods described herein. In some embodiments, a first portion of the body of the single resin product is completely saturated with perchlorate and cannot retain additional perchlorate or nitrate, and a second portion of the of the body of the single resin product has substantially no bonded perchlorate and could retain additional perchlorate or nitrate if so contacted, such as contacted with a fluid which contains perchlorates and/or nitrates.

In some embodiments, the method disclosed herein may include a subsequent contacting step, a subsequent regenerating step, or combinations thereof. The method disclosed herein may include one or multiple subsequent regenerating and/or contacting steps, such that 1, 2, 3, 4, 5, or more subsequent contacting and/or regenerating steps are included in the disclosed method.

After multiple treatment and regeneration cycles, the amount of perchlorates associated onto the single resin will increase to the point where the single resin will be unable to remove any more perchlorates (in that the single resin is completely saturated with perchlorate), even though the single resin has been regenerated and could associate yet more nitrates. At this point, when the single resin can no longer remove perchlorates and/or nitrates from the fluid, the single resin may be discarded and replaced to repeat the previously described steps.

In some embodiments, the method of the present disclosure extends the operative lifetime of the single resin, allowing the single resin to effectively remove nitrates and perchlorates from a fluid stream for a time period of at least about 5 years, at least about 6 years, at least about 7 years, at least about 8 years, at least about 9 years, at least about 10 years, and so on.

EXAMPLES

Example 1

In a water treatment facility prior to treatment of water, amounts of nitrates and perchlorates were measured. The amount of nitrates was found to be between 15 mg/L and 24 mg/L (equivalent to ppm) over several wells prior to treatment. After treatment with a nitrate-specific resin using the method of the present disclosure, the amount of nitrates was measured to be between 1.8 mg/L and 2.4 mg/L (ppm).

The amount of perchlorates was measured to be between 2 μg/L and 19 μg/L (equivalent to ppb) over several wells prior to treatment. After treatment with a nitrate-specific resin using the method of the present disclosure, the amount of perchlorates was below the detection limit to 0.5 ppb, suggesting that the amount of perchlorates is below 0.5 ppb for the water that was tested after treatment.

Further water testing data are shown in the FIGURE.

Without wishing to be bound by theory, it is proposed that the method of the present disclosure, which includes removing both nitrates and perchlorates from a fluid stream using a single resin and regenerating the single resin to thereby remove nitrates bound thereto, can significantly extend the operative lifetime of the single resin.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the FIGURES, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is being used. Therefore, "about 50" means in the range of 45-55.

The term "ppm" is commonly understood to mean "parts per million" and is well-known in the art as a standard unit of concentration. Similarly, the term "ppb" means "parts per billion" and is also known in the art as a standard unit of concentration.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 compounds refers to groups having 1, 2, or 3 compounds. Similarly, a group having 1-5 cells refers to groups having 1, 2, 3, 4, or 5 compounds, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for removing nitrates and perchlorates from a fluid that contains nitrates and perchlorates, the method comprising:

- contacting the fluid with a single resin to cause the single resin to bond to the nitrates and perchlorates,
- regenerating the single resin by a regeneration process comprising contacting the single resin with a salt solution, wherein regenerating removes a substantial portion of the nitrates contained within the single resin but does not remove a substantial portion of the perchlorates contained within the single resin,
- repeating the contacting and regenerating until the single resin no longer removes perchlorates from the fluid, and
- repeating the contacting and regenerating until the single resin no longer removes nitrates from the fluid,
- wherein the single resin comprises a nitrate-specific resin and does not comprise a perchlorate-specific resin.

2. The method of claim 1, wherein the fluid is water.

3. The method of claim 2, wherein the water is selected from the group comprising groundwater, wastewater, industrial wastewater, drinking water, agricultural runoff water, ballast water, aquaculture water, and a combination thereof.

4. The method of claim 1, wherein the fluid contains up to about 50 ppm nitrates prior to removal.

5. The method of claim 1, wherein the fluid contains up to about 10 ppm nitrates after removal.

6. The method of claim 1, wherein the fluid contains up to about 35 ppb perchlorates prior to removal.

7. The method of claim 1, wherein the fluid contains at most about 5 ppb perchlorates after removal.

8. The method of claim 1, wherein the single resin is a strong base anion resin.

9. The method of claim 8, wherein the regeneration process uses about 6 pounds to about 9 pounds of salt per cubic foot of the single resin.

10. The method of claim 1, wherein regenerating does not cause the bonded perchlorate on the single resin to bond to a different portion of the single resin.

* * * * *